United States Patent Office 3,356,485
Patented Dec. 5, 1967

3,356,485
HERBICIDAL COMPOSITION AND METHOD
Basil S. Farah and Everett E. Gilbert, Morris Township, Morris County, and Julian A. Otto, Stockholm, N.J., assignors to Allied Chemical Corporation, New York, N.Y., a corporation of New York
No Drawing. Filed Dec. 11, 1963, Ser. No. 329,891
4 Claims. (Cl. 71—122)

ABSTRACT OF THE DISCLOSURE

Herbicidally active fluorinated ketone derivatives of the formula R—C(OH)(CF$_2$X)$_2$ wherein R is an aryl, alkyl-substituted aryl or halo-substituted radical and X is chlorine or hydrogen.

---

The present invention relates to novel derivatives of fluorinated ketones having herbicidal properties and to a process for the preparation of said derivatives.

The novel fluorinated ketone derivatives of this invention have the following general formula:

$$R\text{—}C(OH)(CF_2X)_2$$

in which R is a member selected from the group consisting of aryl, alkyl-substituted aryl and halo-substituted aryl radicals and X is a member selected from the group consisting of chlorine and hydrogen.

It is known to prepare derivatives of fluorinated ketones by treatment of the ketones with aryl magnesium halides. Processes of this type, commonly known in the art as Grignard reactions, involve the utilization of relatively expensive Grignard reagents. We have now discovered that fluorinated ketone derivatives may be economically prepared in high yield by intimately admixing a ketone of the group consisting of symtetrafluorodichloroacetone (1,1,3,3, - tetrafluoro-1,3 - dichloroacetone) and sym-tetrafluoroacetone (1,1,3,3 - tetrafluoroacetone) with an aromatic compound having the following general formula:

$$RH$$

in which R is a member selected from the group consisting of aryl, alkyl-substituted aryl and halo-substituted aryl radicals in the presence of aluminum chloride as catalyst.

The alkyl-substituted aryl radicals preferably contain alkyl substituents having from 1 to 4 carbon atoms, while the halogen in the halo-substituted aryl radicals is preferably chlorine. Illustrative examples of the aromatic compounds include benzene, toluene, chlorobenzene, paraxylene, ortho - xylene, 1,2,4 - trimethylbenzene, 1,3,5-trimethylbenzene, durene, naphthalene diphenyl ether diphenyl sulfide biphenyl o-, m-, and p-terphenyls, and anisole.

The aluminum chloride is generally employed in ratio of about 0.1 to 1.1 mols per mol of ketone reactant. Although smaller amounts of aluminum chloride may be employed, substantially lower product yields are obtained. Further, use of larger amounts of aluminum chloride merely increases process costs without benefiting product yields. When sym-tetrafluorodichloroacetone is used as reactant, optimum yields are obtained by employing aluminum chloride in about equimolar ratio with respect to the ketone reactant.

The ketone and aromatic compound may be employed in a wide range of mol ratios. The aromatic compound is generally used in at least equal mol ratio with respect to ketone. Representative mol ratios range from about 1 to 10 mols or higher of aromatic compound per mol of ketone.

When the aromatic compound is a liquid, the use of a solvent is optional since the aromatic compound itself functions as a solvent. When, however, the aromatic compound is solid, a solvent must be employed. Suitable solvents include carbon disulfide, aliphatic hydrocarbons such as heptane, hexane, etc., fluorochloro-substituted aliphatic hydrocarbons such as trifluorotrichloroethane and chlorinated aliphatic hydrocarbons such as tetrachloroethylene.

Reaction temperatures range from about —20° to 50° C., and preferably from about 0° to 30° C. Particularly outstanding results are obtained using reaction temperature of about 5° to 15° C. The reaction is generally carried out at these temperatures for reaction period of about ¼ to 5 hours or higher, preferably about ¼ to 1 hour.

The fluorinated ketone derivatives of this invention have been found to possess herbicidal properties and are particularly suitable for post-emergent treatment of undesired vegetation.

The following specific examples will further illustrate the invention. In the examples, parts are by weight.

EXAMPLE 1

*Part A.—Grignard method*

4-chlorophenylmagnesium bromide, a Grignard reagent, was prepared by dissolving 100 parts of 4-chlorobromobenzene in 177 parts of diethylether and adding the solution to 12.15 parts of magnesium over a one hour period. Substantially all of the ether was then distilled off.

99.5 parts of sym-tetrafluorodichloroacetone was mixed with an equal weight of diethyl ether and was added to the Grignard reagent with stirring and cooling in ice over a 20 minute period. The reaction mixture was then refluxed for 90 minutes and allowed to stand overnight at room temperature. The mixture was hydrolyzed with ice and dilute sulfuric acid, thereby forming aqueous and ether layers. The ether layer was separated, deacidified and dried over anhydrous sodium carbonate and then distilled to remove the ether. 74 parts of (1,1,3,3-tetrafluoro-1,3-dichloro-2-hydroxy-2-propyl)-4 - chlorobenzene distilled over at 81–91° C. (mostly at 88° C.) at 2 mm. Hg. This corresponded to a 47.5% yield.

Chlorine analysis of the product gave 34.2% chlorine, as compared to the theoretical value of 34.1%. The product may be represented by the following structural formula:

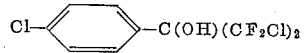

*Part B.—Aluminum chloride catalysis*

A suspension of 44 parts of anhydrous aluminum chloride and 220 parts of chlorobenzene was cooled to 5° C. and treated with 60 parts of sym-tetrafluorodichloroacetone in ½ hour while maintaining the reaction temperature at 5–15° C. by external cooling. The reaction mixture was stirred at 5–10° C. for an additional ½ hour and then poured into 500 parts of ice-water. The resulting organic layer was separated, washed with cold water, dried over anhydrous magnesium sulfate and distilled to give 52 parts of (1,1,3,3-tetrafluoro-1,3,-dichloro-2-hydroxy-2-propyl)-4-chlorobenzene boiling at 124–125° C. at 20 mm. Hg. This corresponded to a yield of 56%.

EXAMPLE 2

*Part A.—Grignard method*

The procedure described in Part A of Example 1 was followed employing sym-tetrafluoroacetone in place of sym-tetrafluorodichloroacetone. A yield of 91 parts (75% of theory) of (1,1,3,3-tetrafluoro-2-hydroxy-2-propyl)-4-chlorobenzene boiling at 98–102° C. at 3.5 mm. Hg was obtained.

Part B.—Aluminum chloride catalysis

The procedure described in Part B of Example 1 is carried out employing sym-tetrafluoroacetone in place of sym-tetrafluorodichloroacetone. (1,1,3,3-tetrafluoro-2-hydroxy-2-propyl)-4-chlorobenzene is obtained as product.

EXAMPLES 3 TO 7

The general procedure set forth in Part B of Example 1 was employed in reacting sym-tetrafluorodichloroacetone with various aromatic compounds. In Example 7, two minor variations were introduced in that an equimolar amount of aluminum chloride with respect to the ketone, instead of a 10% excess, was used, and the final product was extracted with chloroform from the aqueous workup mixture. The results are set forth in the following table:

clude first forming a solution thereof in a suitable organic solvent and thereafter emulsifying the solution in water or aqueous medium with a suitable emulsifying agent, if desired. The solutions or dispersions should contain the active ingredient in an amount not less than 1 pound per hundred gallons of dispersion or solution, the more useful concentration being in the range of 2 to 20 pounds per hundred gallons of dispersion or solution.

Further, the active ingredient may be impregnated on a suitable solid diluent to form wettable powders or dusts. Typical diluents, which may be in finely divided, or, in the case of dusts, also in granular form, include diatomaceous earth, wood flours and silica gels. Wettable powders may contain 10 to 50% by weight active ingredient. The

TABLE

| Ex. | Aromatic Compound | Product | Yield, Percent | Boiling Point, °C. | Analysis of Product | | | | | | | |
|---|---|---|---|---|---|---|---|---|---|---|---|---|
| | | | | | Carbon | | Hydrogen | | Fluorine | | Chlorine | |
| | | | | | Found | Theoretical | Found | Theoretical | Found | Theoretical | Found | Theoretical |
| 3 | Benzene | (1,1,3,3-tetrafluoro-1-3-dichloro-2-hydroxy-2-propyl) benzene. | 76 | 98–100 (15 mm. Hg). | 38.8 | 39.0 | 2.1 | 2.2 | 26.9 | 27.4 | | |
| 4 | Toluene | (1,1,3,3-tetrafluoro-1,3-dichloro-2-hydroxy-2-propyl)-3-methylbenzene. | 67 | 114–115 (20 mm. Hg). | 41.1 | 41.2 | 2.7 | 2.7 | 25.6 | 26.0 | 23.6 | 24.4 |
| 5 | Paraxylene | (1,1,3,3-tetrafluoro-1,3-dichloro-2-hydroxy-2-propyl)-2,5-dimethylbenzene. | 38 | 116–117 (14 mm. Hg). | 43.0 | 43.3 | 3.4 | 3.3 | 24.5 | 24.9 | 23.4 | 23.2 |
| 6 | Orthoxylene | (1,1,3,3-tetrafluoro-1,3-dichloro-2-hydroxy-2-propyl)-3,4-dimethylbenzene. | 64 | 129–130 (15 mm. Hg). | 42.8 | 43.3 | 3.4 | 3.3 | 24.1 | 24.9 | | |
| 7 | 1,2,4-trimethyl benzene. | (1,1,3,3-tetrafluoro-1,3-dichloro-2-hydroxy-2-propyl)-2,4,5-trimethylbenzene. | 62 | 134–135 (15 mm. Hg). | 45.3 | 45.1 | 3.9 | 3.8 | 23.9 | 23.8 | | |

Infrared analysis of all of the products prepared in the above examples showed, in addition to the bands associated with an aromatic system, strong absorption maxima at 2.61 and 7.41 microns attributed to the tertiary hydroxyl group, a broad band at 13.75 microns indicative of the carbon-chlorine linkage and a series of very intense absorption peaks at 8.5–8.9 microns identified with carbon-fluorine linkages.

As indicated above, the fluorinated ketone derivatives of this invention are useful for herbicidal purposes, particularly for post-emergent application. Many of the compounds may be employed for selective post-emergent control of broadleaf or dicotyledonous varieties of plants such as rape, smartweed, Canada thistle, etc., which commonly grow wild in agricultural and other soils. Some of the compounds also destroy the more pernicious monocotyledonous plants or grasses such as ryegrass, foxtail, crab grass, etc.

The fluorinated ketone derivatives may be applied directly to the vegetation to be treated; however, for reasons of economy and to achieve greater uniformity of application it is preferred to incorporate the active ingredient in liquid or solid diluents. Outstanding results may be attained by employing as the diluents, liquids in which the herbicide is soluble or dispersible.

The liquid diluent may be a solvent for the active ingredient, or the active ingredient may be dispersed in the liquid diluent. Since the fluorinated ketone derivatives are soluble in many organic solvents such as benzene, xylene, toluene, acetone, alcohols and chlorinated hydrocarbons, but insoluble in water, it is preferred to disperse them in such organic solvents. If desired, organic solvents which are themselves herbicides may be employed. Other feasible methods of dispersing the active ingredient include dusts may contain as little as 1% by weight of the active ingredient.

Various conventional wetting, dispersing and emulsifying agents may be added to the herbicidal formulations of the type described in order to enhance dispersion in liquid carriers, to enhance the wetting effect and to produce improved dispersion of the active ingredient on the vegetation to which it is applied.

Any of the known types of spraying or dusting apparatus may be employed for applying the herbicide to the vegetation to be treated, a primary consideration being uniformity of application.

The fluorinated ketone derivatives are applied to the area to be treated in amount (pounds per acre) sufficient to afford the desired control of vegetation. The optimum intensity of application will depend on such factors as amount of vegetation in the area, degree of permanency of plant eradication desired, type of plants growing in the area and climatic conditions. Hence, as is well known to those skilled in the art, the rate of application actually used will depend largely on prevailing local conditions. In most instances, effective control of germinating weed seeds and small weed seedlings may be realized by applying the herbicide at an overall rate greater than about 2 pounds per acre. Where longer control of established vegetation is desired, dosages greater than about 20 pounds per acre are employed.

The following example is illustrative of the post-emergent herbicidal activity of the compounds of the present invention.

A test plot was covered with rape and ryegrass plants. Each compound was applied to a designated section of the test plot at the rate of 16 pounds in 40 gallons of acetone per acre, as described by Shaw and Swanson in "Weeds," vol. 1, No. 4, pp. 352–365 (July 1952). The following results were obtained 12 days after treatment:

| Compound | Injury Rating* | |
|---|---|---|
| | Rape | Ryegrass |
| (1,1,3,3-tetrafluoro-1,3-dichloro-2-hydroxy-2-propyl) benzene | 8 | 1 |
| (1,1,3,3-tetrafluoro-1,3-dichloro-2-hydroxy-2-propyl)-3-methylbenzene | 10 | 1 |
| (1,1,3,3-tetrafluoro-1,3-dichloro-2-hydroxy-2-propyl)-2,5-dimethylbenzene | 9 | 1 |
| (1,1,3,3-tetrafluoro-1,3-dichloro-2-hydroxy-2-propyl)-2,4,5-trimethylbenzene | 9 | 3 |
| (1,1,3,3-tetrafluoro-1,3-dichloro-2-hydroxy-2-propyl)-3,4-dimethylbenzene | 9 | 3 |
| (1,1,3,3-tetrafluoro-1,3-dichloro-2-hydroxy-2-propyl)-4-chlorobenzene | 9 | 6 |
| (1,1,3,3-tetrafluoro-2-hydroxy-2-propyl)-4-chlorobenzene | 6 | 5 |
| Untreated check | 0 | 0 |

*Injury Rating: 1–3=slight; 4–6=moderate; 7–9=severe; 10=killed.

As shown above, the first five compounds tested showed selective post-emergent control of broadleaf weeds, while the last two compounds showed control of both broadleaf and grassy weeds.

Since various changes and modifications may be made without departing from the spirit thereof, the invention is to be taken as limited only by the scope of the appended claims.

We claim:
1. A herbicidal composition comprising a phytotoxic quantity of a fluorinated ketone derivative having the following formula:

$$R—C(OH)(CF_2X)_2$$

in which R is a member selected from the group consisting of aryl, alkyl-substituted aryl wherein the alkyl has 1 to 4 carbon atoms and halo-substituted aryl radicals and X is a member selected from the group consisting of chlorine and hydrogen, a solid diluent therefor and at least one of wetting, dispersing and emulsifying agents.

2. The method of combatting growth of undesired vegetation which comprises applying to said vegetation a phytotoxic quantity of a fluorinated ketone derivative having the following formula:

$$R—C(OH)(CF_2X)_2$$

in which R is a member selected from the group consisting of aryl, alkyl-substituted aryl wherein the alkyl has 1 to 4 carbon atoms and halo-substituted aryl radicals and X is a member selected from the group consisting of chlorine and hydrogen.

3. The method of combatting growth of dicotyledonous plants which comprises the post-emergent treatment of soil in which such plants are growing with a phytotoxic quantity of a fluorinated ketone derivative having the following formula:

$$R—C(OH)(CF_2Cl)_2$$

in which R is an aryl radical.

4. The method of combatting growth of dicotyledonous plants which comprises the post-emergent treatment of soil in which such plants are growing with a phytotoxic quantity of a fluorinated ketone derivative having the following formula:

$$R—C(OH)(CF_2Cl)_2$$

in which R is an alkyl-substituted aryl radical wherein the alkyl has 1 to 4 carbon atoms.

References Cited

UNITED STATES PATENTS

| 2,926,078 | 2/1960 | Josephs | 71—2.3 |
| 2,981,619 | 4/1961 | Josephs | 71—2.3 |
| 3,179,640 | 4/1965 | Middleton | 260—618 |
| 3,236,894 | 2/1966 | England | 260—618 |

JAMES O. THOMAS, Jr., *Primary Examiner.*